(12) United States Patent
Lee

(10) Patent No.: US 9,196,038 B2
(45) Date of Patent: Nov. 24, 2015

(54) RECIPE BASED METHOD FOR TIME-LAPSE IMAGE ANALYSIS

(71) Applicant: DRVision Technologies LLC

(72) Inventor: Shih-Jong James Lee, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 138 days.

(21) Appl. No.: 14/222,657

(22) Filed: Mar. 23, 2014

(65) Prior Publication Data

US 2015/0269730 A1    Sep. 24, 2015

(51) Int. Cl.
  *G06T 5/00*    (2006.01)
  *G06T 7/00*    (2006.01)

(52) U.S. Cl.
  CPC ..... *G06T 7/0022* (2013.01); *G06T 2207/10016* (2013.01); *G06T 2207/20008* (2013.01)

(58) Field of Classification Search
  CPC combination set(s) only.
  See application file for complete search history.

(56) References Cited

U.S. PATENT DOCUMENTS 7,849,024 B2 * 12/2010 Lee ............................. G06T 5/00
                                                         382/155

* cited by examiner

*Primary Examiner* — Duy M Dang

(57) ABSTRACT

A computerized recipe station for time-lapse image analysis method includes the steps of inputting an image sequence and an initial recipe to a computer storage; performing by a computer program an incremental apply using the image sequence and the initial recipe to generate an incremental output; pausing the incremental apply; using the incremental output to perform an incremental output assurance operation, which may be an intermediate result analysis to generate an analysis output, a recipe update to generate an updated recipe, or a result editing to generate an edited incremental output; and continuing the incremental apply until pausing or completion to generate a processing output. The analysis output generated by the intermediate result analysis may be used to guide the recipe update step or used to guide the result editing step.

30 Claims, 8 Drawing Sheets

RECIPE BASED METHOD FOR TIME-LAPSE IMAGE ANALYSIS

STATEMENT AS TO RIGHTS TO INVENTIONS MADE UNDER FEDERALLY SPONSORED RESEARCH AND DEVELOPMENT

This work was supported by U.S. Government grant number 5R44HL106863-03, awarded by the National Heart, Lung, and Blood Institutes. The U.S. Government may have certain rights in the invention.

BACKGROUND OF THE INVENTION

1. Field of the Invention

The present invention relates to computerized time-lapse image analysis and more particularly to a recipe station framework to support intuitive workflow that starts with incremental recipe execution, continuous result monitoring with image guided data analysis/data guided image visualization, recipe fine-tuning, and mask and track editing.

2. Description of the Related Art a. Description of Problem that Motivated Invention The technology advancement has enabled the routine acquisition of movie (image sequences) from not only video cameras but also smart phones. Therefore, the demand for time-lapse (rather than fixed point) image analysis becomes more prevalent. In the bioscience field, the advent of time-lapse microscopy and live cell fluorescence probes has enabled biologists to visualize the inner working of living cells in their natural context. Expectations are high for breakthroughs in area such as cell response and motility modification by drugs, control of targeted sequence incorporation into the chromatin for cell therapy, spatial-temporal organization of the cells and its changes with time or under infection, assessment of pathogens routing into the cell, interaction between proteins, and sanitary control of pathogen evolution, etc. The breakthroughs could revolutionize the broad fields in basic research, drug discovery and disease diagnosis.

Deciphering the complex machinery of cell function and dysfunction necessitates a detailed understanding of the dynamics of proteins, organelles, and cell populations. Due to the complexity of the time-lapse image analysis tasks to cover the wide range of highly variable and intricate properties of biological material, it is difficult to have fully automated solutions except some dedicated high-volume applications such as cancer screening, wafer defect inspection. Most of the computerized image analysis applications require interactive confirmation, editing and data analysis by users.

After tackling the huge complexities involved in establishing a live cell imaging study, scientists are often frustrated by the difficulties of image quantification that requires either tedious manual operations or specialized image processing and programming skills to achieve the desired outcomes. It is highly desirable to have an intuitive, easy-to-use workflow for obtaining optimal time-lapse analysis outcomes and efficient result viewing and sharing without specialized image processing and programming knowledge.

b. How Did Prior Art Handle the Problem?

The prior art approach provides manual analysis tools or manual editing tools. However, the tools become impractical for time-lapse image analysis, as the data volume is high and the errors could accumulate over time. For example, in tracking applications of time-lapse image sequence, a wrong track assignment in an early time frame will propagate to the later time frames. This causes significant inefficiency for a user to review and correct the mistakes, as the same mistakes have to be repeatedly corrected.

Furthermore, for a meaningful spatial-temporal analysis, the time-lapse image sequence has to cover a long time duration which has high data volume that requires timely review and timely correction of analysis error or timely updates of the processing instructions (recipes) to achieve good outcome efficiently. The existing tools do not facilitate the above requirements.

Therefore, a more sophisticated computerized framework and method for time-lapse image analysis is urgently needed to address the deficiencies of the prior art methods.

BRIEF SUMMARY OF THE INVENTION

The primary objective of the invention is to provide an intuitive recipe station for a user to incrementally apply image analysis recipe and monitor the intermediate results of a time-lapse movie. The secondary objective of the invention is to allow a user to pause the time-lapse image analysis to perform intermediate result analysis. The third objective of the invention is to allow a user to optimize the time-lapse image analysis by intermediate recipe update. The fourth objective of the invention is to allow a user to optimize the time-lapse image analysis by intermediate result editing. The fifth objective of the invention is to allow the recording of processing history for reproducing the results or creating an adaptive recipe for volume data processing.

The current invention provides a recipe station framework to support intuitive workflow that starts with incremental recipe execution, continuous result monitoring with image guided data analysis/data guided image visualization, recipe fine-tuning, and mask and track editing.

The computerized recipe station for time-lapse image analysis method according to the present invention comprises the steps of:
  a) inputting an image sequence and an initial recipe to a computer storage;
  b) performing by a computer program an incremental apply using the image sequence and the initial recipe to generate an incremental output;
  c) pausing the incremental apply;
  d) using the incremental output to perform an incremental output assurance operation, which may be a group consisting of intermediate result analysis, recipe update, or result editing to generate an edited incremental output; and
  e) continuing the incremental apply until pausing or completion to generate a processing output.

Furthermore, the analysis output generated by the intermediate result analysis in step d) may be used to guide the recipe update step or used to guide the result editing step.

DETAILED DESCRIPTION OF THE INVENTION

I. Application Scenarios

Figure 1:
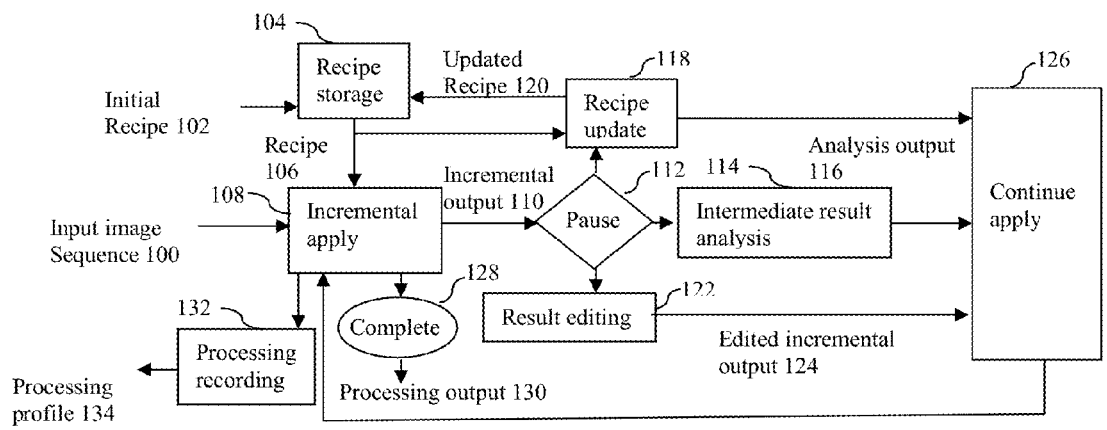
FIG. 1 shows the processing flow of the computerized recipe station for time-lapse image analysis method.

FIG. 1 shows the processing flow of the computerized recipe station for time-lapse image analysis method. An input image sequence 100 and an initial recipe 102 is loaded into a computer memory for incremental apply 108 performed by a computer program. The initial recipe 102 is stored in a computer recipe storage 104 that maintains the recipe 106 to be used. The incremental apply 108 step processes the input image sequence 100 using the recipe 106 to generate an incremental output 110 that incrementally stores the processing results of the image frames up to the current frame. The incremental output 110 can be viewed during the incremental apply 108 and the incremental apply 108 can be paused 112. After pausing, the incremental output 110 up to the paused frame can be used for incremental output assurance. The incremental output assurance could be performed by intermediate result analysis 114, recipe update 118 or result editing 122. The intermediate result analysis 114 generates analysis output 116. The recipe update 118 generates updated recipe 120 and the result editing 122 generates edited incremental output 124. After the incremental output assurance operations, a continue apply 126 is invoked and the incremental apply is continued from the current frame or an earlier frame specified by a user. The processing continues until it is paused and the incremental output assurance process is repeated or until the processing is completed 128 for all time frames and processing output 130 is generated. A processing recording 132 step records the processing history and generates a processing profile 134.

Figure 2:
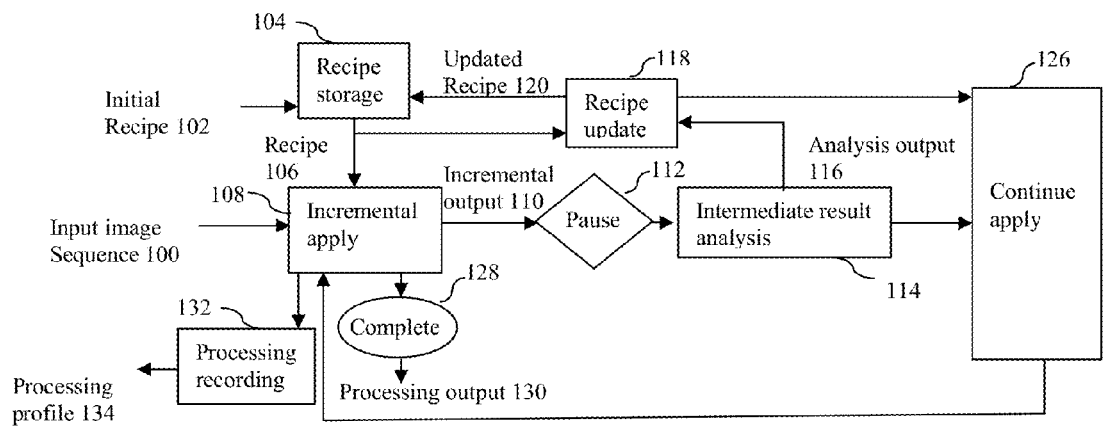
FIG. 2 shows an alternative processing flow of the computerized recipe station for time-lapse image analysis method.

FIG. 2 shows an alternative processing flow of the computerized recipe station for time-lapse image analysis method. In the processing flow, after pausing, the incremental output assurance is performed by the intermediate result analysis 114 that generates analysis output 116. The analysis output 116 is used to guide the recipe update 118 step to generate updated recipe 120. After the recipe is updated a continue apply 126 is invoked and the incremental apply 108 is continued from the current frame or a frame specified by a user.

Figure 3:
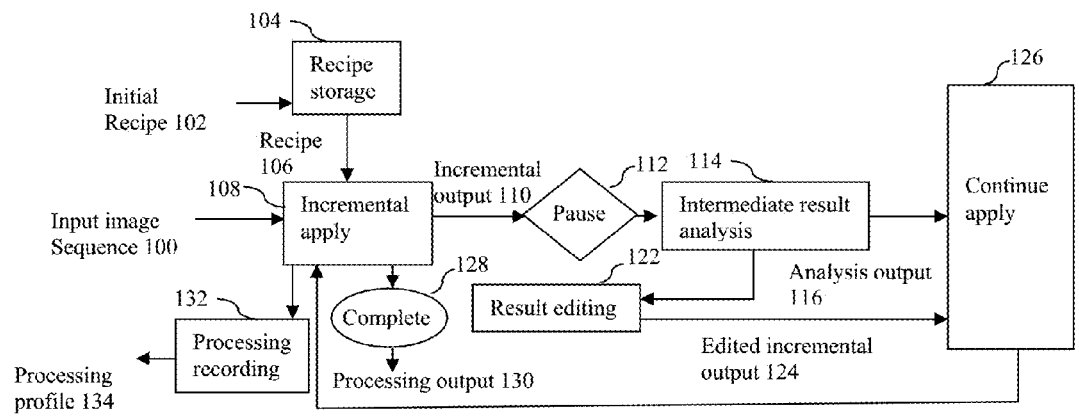
FIG. 3 shows another alternative processing flow of the computerized recipe station for time-lapse image analysis method.

FIG. 3 shows another alternative processing flow of the computerized recipe station for time-lapse image analysis method. In the processing flow, after pausing, the incremental output assurance is performed by the intermediate result analysis 114 that generates analysis output 116. The analysis output 116 is used to guide the result editing 122 step to generate edited incremental output 124. After the edited incremental output 124 is generated, a continue apply 126 is invoked and the incremental apply 108 is continued from the current frame or a frame specified by a user.

II. Input Image Sequence

The input image sequence 100 can be acquired from any digitization methods such as a camera, a smart phone, a scanner, photomultipliers, image sensors, etc. The images can be acquired with different spectra and modalities such as bright field, dark field, X-ray, IR, ultrasound, lasers, etc. as time-lapse (X, Y, T) sequence. It could also include Z dimension (3D) and multiple spectra.

In one embodiment of the invention, microscopy image sequences are used as the input images. The microscopy images can be acquired from different microscopy modes such as Total internal reflection fluorescence microscopy (TIRF), bright-field, Phase contrast, Differential interference contrast (DIC) microscopy, FRAP, FLIM and FRET and also could be from 2D and 3D microscopy such as inverted, confocal and super-resolution microscopes.

III. Initial Recipe

Figure 4:
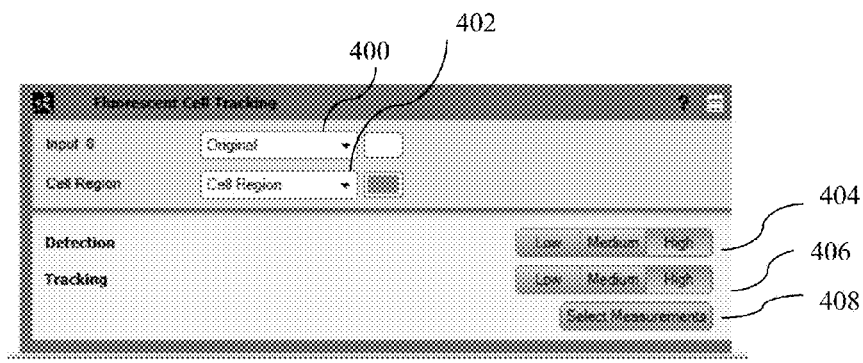
FIG. 4 shows an embodiment of the initial recipe setting.

A recipe contains instructions for computer image sequence processing for time-lapse image applications such as object tracking, object counting, lineage analysis, exocytosis analysis, colony analysis, etc. The recipe processing steps may contain combinations of operations selected from a group consisting of enhancement, segmentation, tracking, subset gating, decision, analysis and measurements, etc. In one embodiment of the invention, the initial recipe 102 could be generated using the method disclosed in the U.S. Pat. No. 7,849,024, to Lee et, al, "Imaging system for producing recipes using an integrated human-computer interface (HCl) for image recognition, and learning algorithms". FIG. 4 shows an embodiment of the initial recipe for fluorescent cell tracking. It includes an input, output specifications 400, 402 and configuration selection buttons 404, 406 and 408.

Other embodiments may exclude the input/output specification through automatic routing. The configuration selection buttons may or may not be necessary.

IV. Incremental Apply, Pause and Continue Apply

The incremental apply 108 step allows the incremental execution of the recipe over consecutive time frames of the time-lapse image sequence. This can be performed by applying in step, one frame at a time, or by continuing applying to consecutive frames until being paused. After an incremental apply is paused, it could be continued from the frame it paused or continue from a user selected frame.

Figure 5:
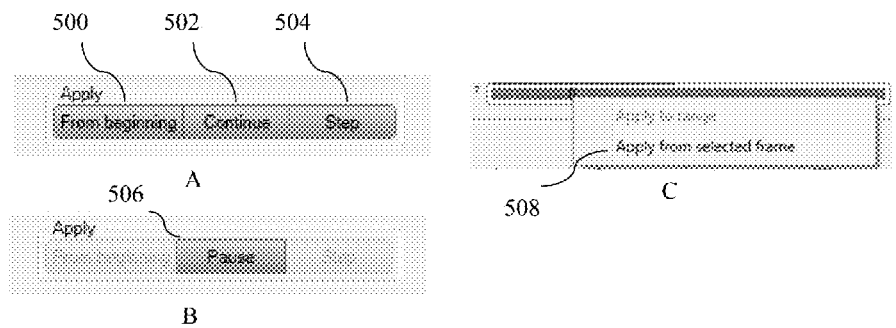
FIG. 5A shows an embodiment of the control buttons for incremental apply.
FIG. 5B shows an embodiment of the pause button during incremental apply.
FIG. 5C shows an embodiment of apply from selected time frame.

FIG. 5A shows an embodiment of the control buttons for incremental apply 108 including apply from beginning 500, continue 502 and step 504. FIG. 5B shows an embodiment of the pause button 506 during incremental apply 108. FIG. 5C shows an embodiment of a menu selection for continue apply from selected frame 508. If recipe is updated, the continue apply 126 will apply using the updated recipe 120 from the recipe storage 104.

Other embodiments of the incremental apply 108 include keyboard control rather than button control. It could also include fast forward/backward for review and/or shortcut keys.

V. Incremental Output

Figure 6:
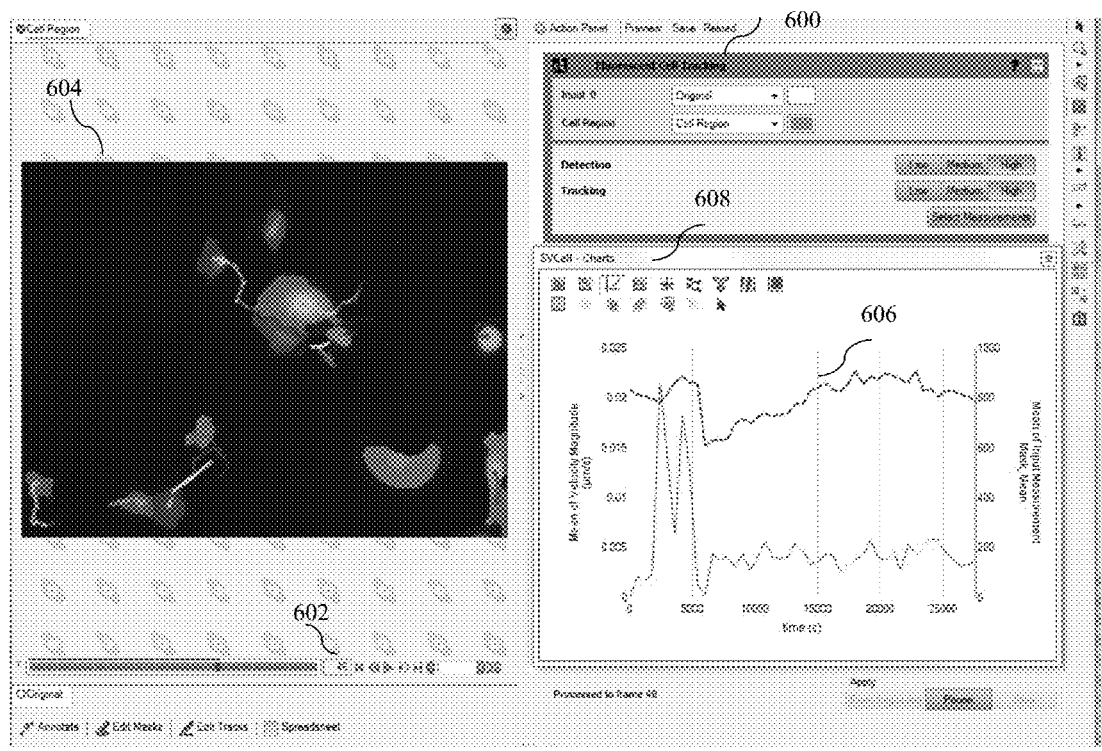
FIG. 6 shows an embodiment of the incremental output viewing.

During incremental apply 108, an incremental output 110 is generated. The incremental output 110 is updated after each new frame is processed. The incremental output can be viewed to monitor the processing progress and quality. FIG. 6 shows an embodiment of viewing of the incremental output 110. The example recipe is for Florescence Cell Tracking 600, the incremental apply 108 processing is on-going and the current frame is at the $46^{th}$ frame 602. The incremental output 110 can be viewed from the image display 604 showing detected cell masks and the trajectories for the tracked cells. In addition, the measurements up to the current frame can be shown in object data graph 606 shown in the chart window 608. Note that the image display 604 and object data graph 606 are updated after each new frame is processed.

VI. Intermediate Result Analysis

After the incremental apply 108 is paused 112, the intermediate result analysis 114 step using the incremental output 110 to generate analysis output 116. In one embodiment, the intermediate result analysis 114 performs an analysis step selected from a group consisting of reviewing image display 604; reviewing at least one object data graph 606; and reviewing at least one object data sheet. This generates the analysis output 116.

The image display 604 highlights the detected objects with object indicators such as object masks with different labels. The image display highlights the tracked objects with track indicators such as trajectory display of a selected number of frames. The trajectory display could be encoded so that it could fade with time and/or use different colors for time indication or for tracked object features (velocity, direction, etc.) indications. The at least one object data graph 606 may be selected from a group consisting of a feature histogram plot, an object histogram plot, a scatter plot and a stacked scatter plot, radial graph, mesh graph, surface graph, and volumetric graph, etc.

Figures 7, 8:
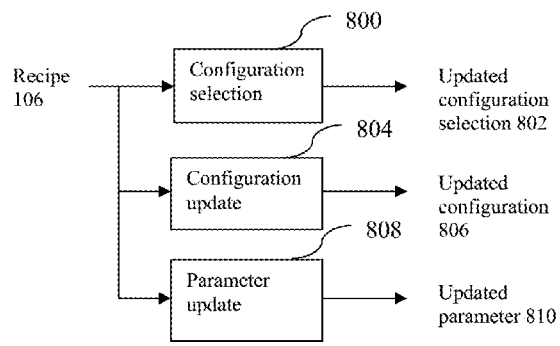
FIG. 7 shows an embodiment of the object data sheet.
FIG. 8 shows the processing flow of the recipe update step.

One embodiment of the object data sheet is shown in FIG. 7. The object data sheet can be opened by clicking on a "Spreadsheet" 700 button. In the data sheet, the object measurements 702 are displayed and the data can be sorted, charted and exported.

In one embodiment of the invention, the image display 604, the at least one object data graph 606, and the at least one object data sheet are linked in a way such that selecting an object in one display mode also selects the object in other display modes. This facilitates efficient intermediate result analysis in a data guided or image guided fashion.

VII. Recipe Update

The recipe update 118 step inputs the recipe 106 and performs an update step selected from a group consisting of configuration selection 800, configuration update 804 and parameter update 808. This generates the updated recipe 120 that could include at least one of the updated configuration selection 802, updated configuration 806, and updated parameter 810 (see FIG. 8).

A. Configuration Selection

Figure 9:
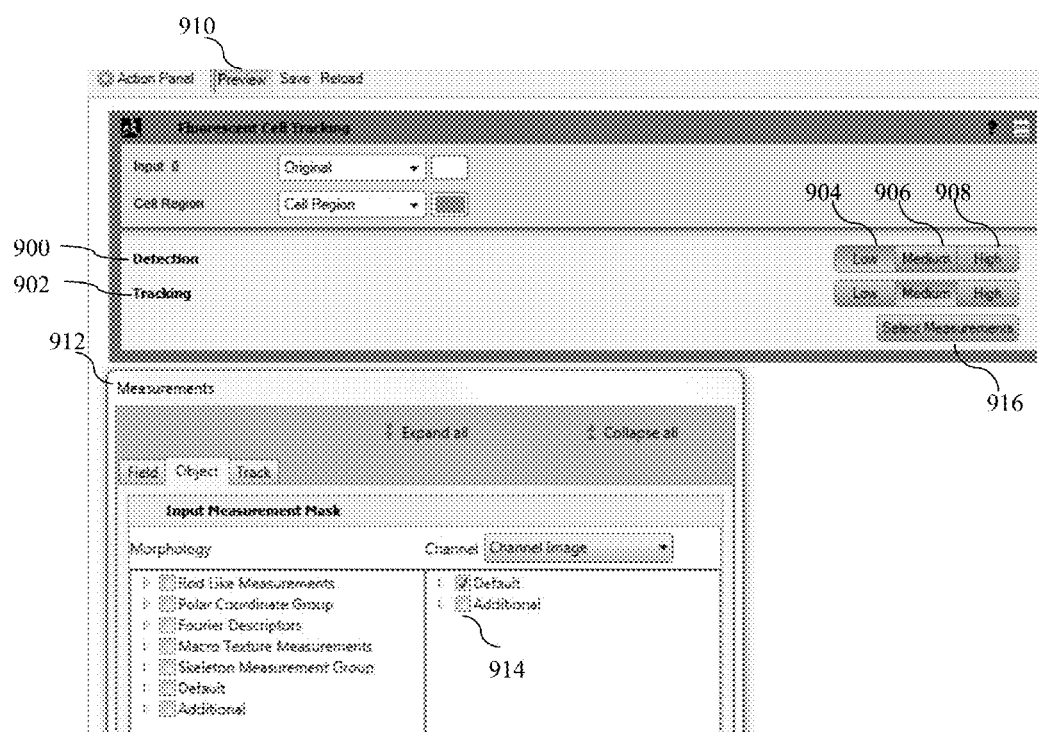
FIG. 9 shows an embodiment of configuration selection and configuration update.

The recipe parameters can be grouped into different sets such as detection parameters, tracking parameters, decision parameters, measurement parameters, etc. One or more parameters could exist within each set. For the parameters in a set, their values could be pre-configured into multiple pre-set configurations that are tuned for different use cases. In one embodiment of the invention as shown in FIG. 9, the grouped sets include "Detection" 900 and "Tracking" 902. The pre-set configurations for "Detection" 900 are "Low" 904 "medium" 906 and "High" 908. Similarly, the pre-set configurations for "Tracking" 902 are also "Low", 904 "medium" 906 and "High" 908. The recipe update step 118 could perform configuration selection 800 that selects, in the example embodiment, one of the "Low", 904 "medium" 906 and "High" 908 from each of the "Detection" 900 and "Tracking" 902 sets. A Preview 910 option can be invoked to allow the viewing of the updated incremental output for the current frame or a newly selected frame. The updated configuration selection 802 is stored in the updated recipe 120.

Other embodiment may have more or fewer pre-set configurations. In one embodiment, the configuration can be selected by selecting different values in a slider bar.

B. Configuration Update

In addition to configuration selection 800, some configurations such as measurements 912 can also be updated. In these configurations, there are pre-defined measurement items 914 that can be turned on and off. In the example embodiment, the measurements 912 window can be invoked by clicking the "Select Measurements" 916 button. After the configuration update 804, the updated Configuration 806 is stored in the updated recipe 120.

C. Parameter Update

Figure 10:
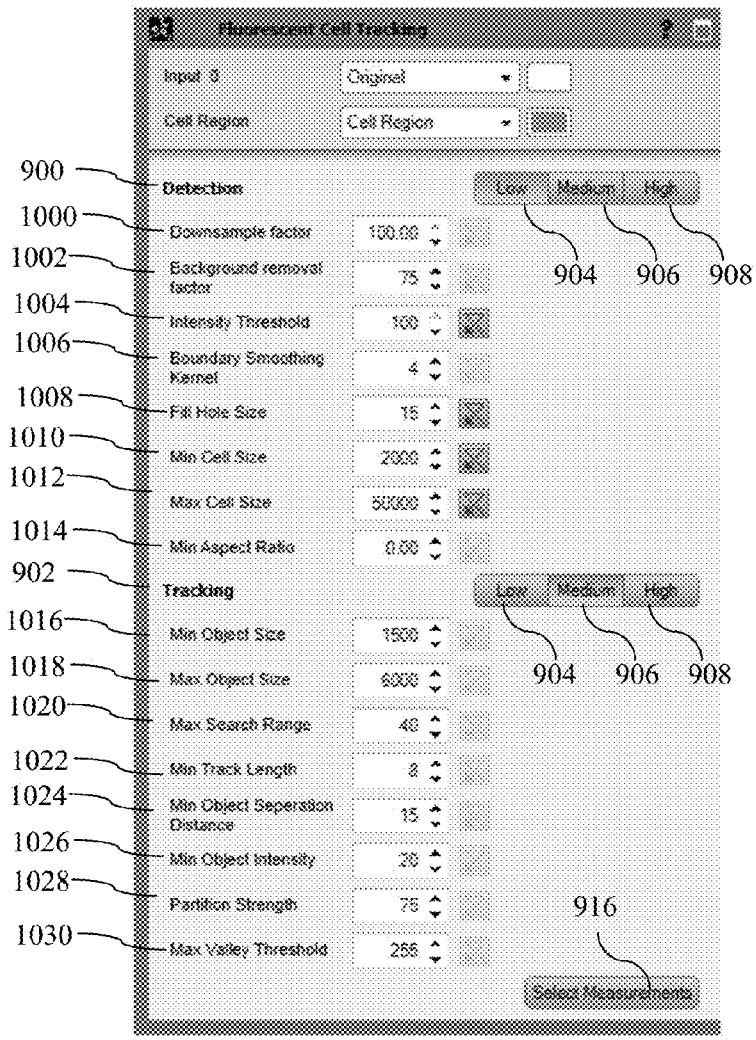
FIG. 10 shows an embodiment of recipe parameter update.

Configuration selection 800 is user friendly for non-technical users. But it has its limitations, as the adjustment is limited to the pre-set configurations. The parameter update 808 step allows more technical competent users to perform fine adjustment of the parameters underlying the pre-set configurations. FIG. 10 shows one embodiment of the parameter update 808. The parameters associated with each set can be made visible and adjustable to users. In FIG. 10, parameters 1000-1014 correspond to the set "detection" 900. The pre-set configuration "Low" 904 "medium" 906 and "High" 908 each defines specific values for parameters 1000-1014. Users can view those pre-configured values by clicking on "Low" 904, "medium" 906, or "High" 908 button. Users can adjust at least one value of the parameters 1000-1014 to tune the performance. The Preview 910 option can also be invoked to allow the viewing of the updated incremental output for the current frame or a newly selected frame after the parameter adjustment. After the parameter update 808, the updated Parameter 810 is stored in the updated recipe 120.

VIII. Result Editing

Figure 11:
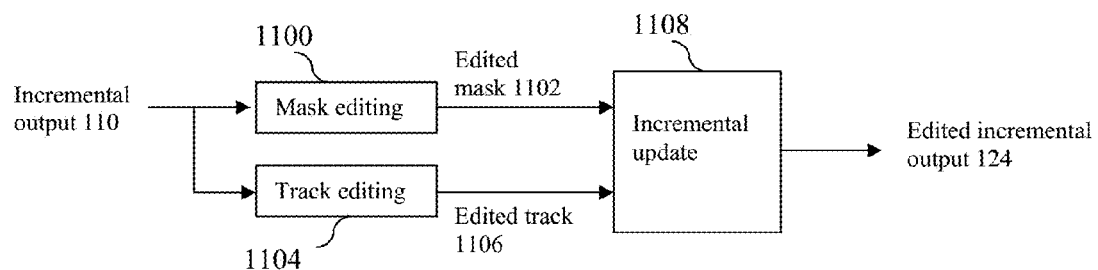
FIG. 11 shows the processing flow of the result editing step.

FIG. 11 shows the processing flow of the result editing step. The result editing 122 step inputs the incremental output 110 and performs a mask editing 1100 or a track editing 1104 step or both. The mask editing step 1100 edits mask from the incremental output 110 to generate edited mask 1102 output. The track editing step 1104 edits track from the incremental output 110 to generate edited track 1106 output. In another embodiment of the invention, the edited mask 1102 output is used to perform track editing 1104 to generate edited track 1106 output. In yet another embodiment of the invention, the edited track 1106 is used to perform mask editing 1100 to generate edited mask 1102 output. In an alternative embodiment of the invention, the edited mask 1102 and/or edited track 1106 are processed by an incremental update 1108 step to generate edited incremental output 124. The incremental update 1108 step, taking the edited mask 1102 and updates the incremental output to reflect the changes in masks. This generates the edited incremental output 124. For example, the object count is updated if the edited mask 1102 changes the number of objects. For the objects whose masks are updated, their associated measurements such as size, shape, intensity statistics are also updated. In the case of tracking applications, the tracks and tracking measurements such as object velocity, lineage, etc. are also updated if the edited masks change the tracks. For the tracks updated in the edited track 1106, their associated tracking measurements such as object velocity, lineage, etc. are also updated.

A. Mask Editing

Figure 12:
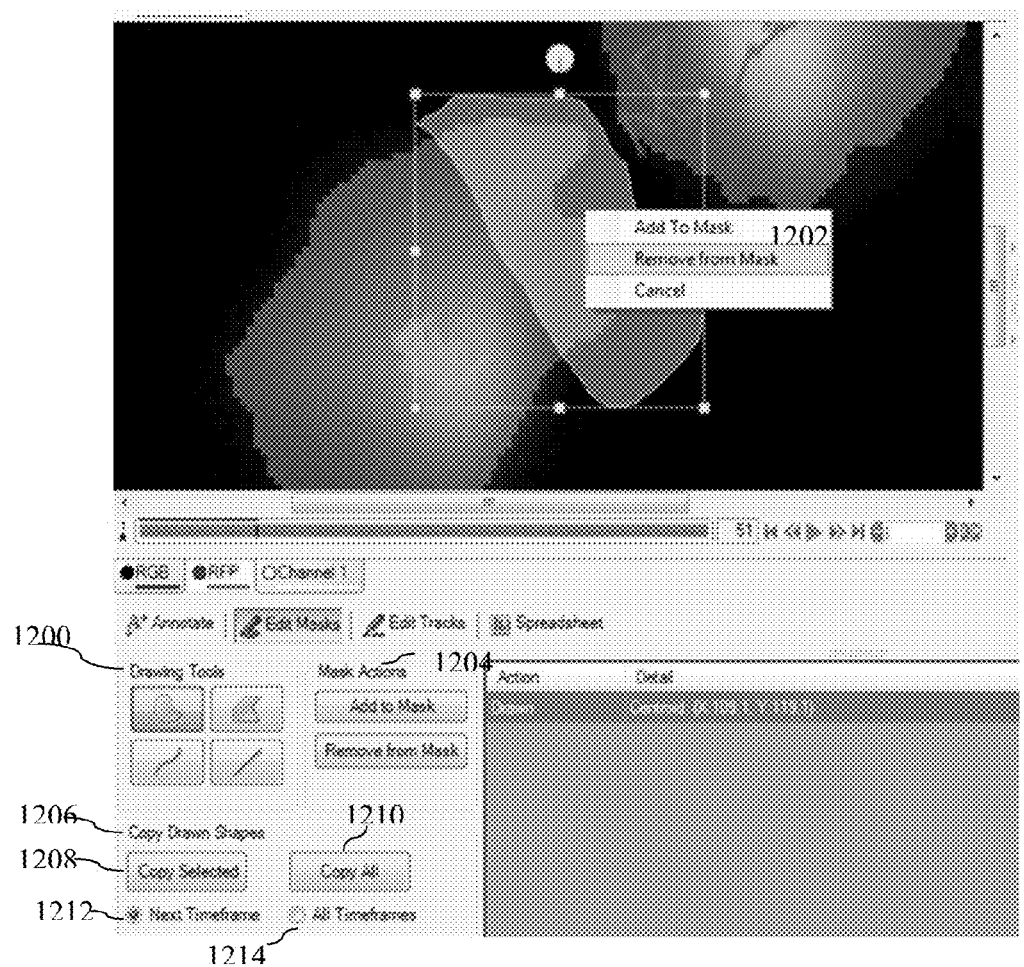
FIG. 12 shows an embodiment of mask editing.

An embodiment of the mask editing 1100 step is shown in FIG. 12. The drawing tools 1200 allows users to draw the desired mask region in the image and a mask action 1202 or 1204 can be selected. In the example embodiment, the action includes "Add to Mask" that adds the user drawn region(s) into the mask, "Remove from Mask" that removes the user drawn region(s) from the mask and "Cancel" that cancels the user drawing. To make the mask editing 1100 efficient, the drawn shapes can be copied using the "Copy Drawn Shapes"

1206 selection. This allows copy selected 1208 or copy all 1210 to the next time frame 1212 or all timeframes 1214.

In other embodiment, the drawing tool includes other shapes such as circle/ellipse, square/rectangle. The editing can also be extended to 3D mask editing for 3D image processing. In this case circle becomes sphere. Square becomes cube.

B. Track Editing

Figure 13:
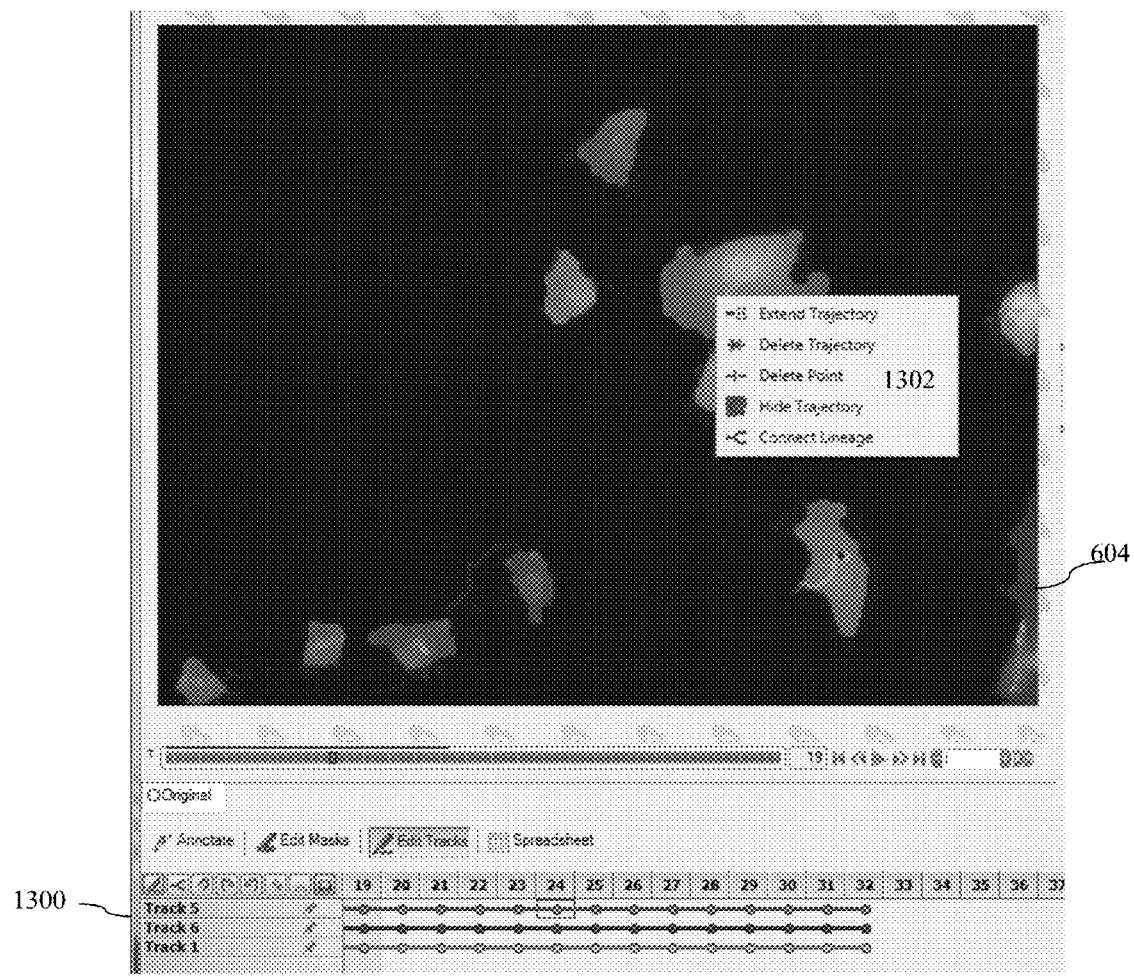
FIG. 13 shows an embodiment of track editing.

An embodiment of the track editing 1104 step is shown in FIG. 13. A user selects the tracks to be edited by clicking the trajectory display on the image. Multiple tracks can be selected. The selected tracks can also be displayed in a grid view 1300. Track editing actions can be performed in either image display 604 and/or the grid view 1300. The editing action includes connecting trajectories and other actions from the action menu 1302 such as Extend Trajectory, Delete Trajectory, Delete Point, Connect Lineage, etc. The connect lineage action allows the connecting of tracks as the parent and children of a division event.

In other embodiment, new track can be created by clicking the desired time frames and locations. A mask can also be manually created for each instance of the newly created track.

IX. Processing Recording

The processing recording step 132 generates a processing profile 134 output. This records the incremental apply 108 process and its associated update and editing steps until its completion so that the processing result 130 can be reproduced. It also allows the sharing of the processing information for reference and/or improvement. The processing profile 134 consists of initial recipe and recipe update. Also it includes the updates in the result editing 122 including mask and track editing steps 1100/1104. In one embodiment of the invention, the processing profile 134 is converted to an adaptive recipe for volume data processing. The adaptive recipe will perform automatic intermediate recipe update at the time frame according to the processing profile 134. The adaptive recipe can also perform automatic intermediate editing according to the processing profile 134.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized recipe based method for time-lapse image analysis, comprising the steps of:
    a) inputting an image sequence and an initial recipe to a computer storage;
    b) performing by a computer program an incremental apply using the image sequence and the initial recipe to generate an incremental output;
    c) pausing the incremental apply;
    d) using the incremental output to perform an incremental output assurance operation selected from a group consisting of intermediate result analysis to generate an analysis output, recipe update to generate an updated recipe, and result editing to generate an edited incremental output; and
    e) continuing the incremental apply until pausing or completion of all time frames to generate a processing output.

2. The method of claim 1, wherein the result editing is selected from a group consisting of mask editing and track editing.

3. The method of claim 1, wherein the recipe update takes as input a recipe and performs an update step selected from a group consisting of configuration selection, configuration update and parameter update.

4. The method of claim 1, wherein the intermediate result analysis takes as input the incremental output and performs an analysis step selected from a group consisting of:
    reviewing an image display;
    reviewing at least one object data graph; and
    reviewing at least one object data sheet.

5. The method of claim 1, further comprising a processing recording step to generate a processing profile.

6. The method of claim 2, wherein the result editing further comprises an incremental update to generate the edited incremental output.

7. The method of claim 4, wherein the image display highlights the detected objects with object indicators.

8. The method of claim 4, wherein the image display highlights the tracked objects with track indicators.

9. The method of claim 4, wherein the at least one object data graph is selected from a group consisting of a feature histogram plot, an object histogram plot, a scatter plot, a stacked scatter plot, radial graph, mesh graph, surface graph, and volumetric graph.

10. The method of claim 4, wherein the image display, the at least one object data graph, and the at least one object data sheet are linked in a way such that selecting an object in one display mode also selects the object in other display modes.

11. The method of claim 5, wherein the processing profile comprises the initial recipe and the updated recipe.

12. The method of claim 5, wherein the processing profile comprises the initial recipe and steps of the result editing.

13. The method of claim 5, wherein the processing profile is converted to an adaptive recipe.

14. The method of claim 13, wherein the adaptive recipe performs automatic intermediate recipe update according to the processing profile.

15. The method of claim 13, wherein the adaptive recipe performs automatic intermediate recipe editing according to the processing profile.

16. A computerized recipe based method for time-lapse image analysis, comprising the steps of:
    a) inputting an image sequence and an initial recipe to a computer storage;
    b) performing by a computer program an incremental apply using the image sequence and the initial recipe to generate an incremental output;
    c) pausing the incremental apply;
    d) performing an intermediate result analysis using the incremental output to generate an analysis output;
    e) performing a recipe update using the analysis output to generate an updated recipe; and
    f) continuing the incremental apply using the updated recipe until pausing or completion of all time frames to generate a processing output.

17. The method of claim 16, wherein the recipe update takes as input a recipe and performs an update step selected from a group consisting of configuration selection, configuration update and parameter update.

18. The method of claim 16, wherein the intermediate result analysis takes as input the incremental output and performs an analysis step selected from a group consisting of:
    reviewing an image display;
    reviewing at least one object data graph; and
    reviewing at least one object data sheet.

19. The method of claim 16, further comprising a processing recording step to generate a processing profile.

20. The method of claim 19, wherein the processing profile comprises the initial recipe and the updated recipe.

21. The method of claim 19, wherein the processing profile is converted to an adaptive recipe.

22. The method of claim 21, wherein the adaptive recipe performs automatic intermediate recipe update according to the processing profile.

23. A computerized recipe based method for time-lapse image analysis, comprising the steps of:
   a) inputting an image sequence and an initial recipe to a computer storage;
   b) performing by a computer program an incremental apply using the image sequence and the initial recipe to generate an incremental output;
   c) pausing the incremental apply;
   d) performing an intermediate result analysis using the incremental output to generate an analysis output;
   e) performing a result editing using the analysis output to generate an edited incremental output; and
   f) continuing the incremental apply until pausing or completion of all time frames to generate a processing output.

24. The method of claim 23, wherein the result editing is selected from a group consisting of mask editing and track editing.

25. The method of claim 23, wherein the intermediate result analysis takes as input the incremental output and performs an analysis step selected from a group consisting of:
   reviewing image display;
   reviewing at least one object data graph; and
   reviewing at least one object data sheet.

26. The method of claim 23, further comprising a processing recording step to generate a processing profile.

27. The method of claim 24, wherein the result editing further comprises an incremental update to generate the edited incremental output.

28. The method of claim 26 wherein the processing profile comprises the initial recipe and steps of the result editing.

29. The method of claim 26, wherein the processing profile is converted to an adaptive recipe.

30. The method of claim 29, wherein the adaptive recipe performs automatic intermediate recipe editing according to the processing profile.

* * * * *